United States Patent
Frank et al.

(10) Patent No.: US 8,112,324 B2
(45) Date of Patent: Feb. 7, 2012

(54) COLLABORATIVE STRUCTURED TAGGING FOR ITEM ENCYCLOPEDIAS

(75) Inventors: Martin R. Frank, Bainbridge Island, WA (US); Walter Manching Tseng, Bainbridge Island, WA (US); Charles E. Groom, Seattle, WA (US); Fred Farhad Sadaghiani, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1370 days.

(21) Appl. No.: 11/276,539

(22) Filed: Mar. 3, 2006

(65) Prior Publication Data

US 2007/0226077 A1 Sep. 27, 2007

(51) Int. Cl.
*G06Q 30/00* (2006.01)

(52) U.S. Cl. .......... 705/27.1; 705/26.1; 705/37; 705/39; 705/40; 705/50; 707/104.1; 707/100

(58) Field of Classification Search .................... 705/26, 705/27, 37, 39, 40, 50, 26.1, 27.1; 707/104.1, 707/100
See application file for complete search history.

(56) References Cited

U.S. PATENT DOCUMENTS

| | | | |
|---|---|---|---|
| 5,740,425 | A | 4/1998 | Povilus |
| 6,041,311 | A | 3/2000 | Chislenko et al. |
| 7,100,199 | B2 | 8/2006 | Ginter et al. |
| 7,117,262 | B2 | 10/2006 | Bai et al. |
| 7,197,475 | B1 | 3/2007 | Lorenzen et al. |
| 7,668,821 | B1 * | 2/2010 | Donsbach et al. ............ 707/765 |
| 2001/0047297 | A1 | 11/2001 | Wen |
| 2002/0007309 | A1 | 1/2002 | Reynar |
| 2002/0013792 | A1 | 1/2002 | Imielinski et al. |
| 2002/0024532 | A1 | 2/2002 | Fables et al. |
| 2002/0059272 | A1 | 5/2002 | Porter |
| 2002/0076674 | A1 | 6/2002 | Kaplan |
| 2002/0111146 | A1 | 8/2002 | Fridman et al. |
| 2002/0120504 | A1 | 8/2002 | Gould et al. |
| 2002/0147625 | A1 | 10/2002 | Kolke, Jr. |
| 2002/0173972 | A1 | 11/2002 | Daniel et al. |
| 2002/0174059 | A1 | 11/2002 | Guo |
| 2002/0198933 | A1 | 12/2002 | Kwak |
| 2003/0041108 | A1 | 2/2003 | Henrick et al. |

(Continued)

FOREIGN PATENT DOCUMENTS

WO    WO03019418 A1    3/2003

OTHER PUBLICATIONS

Battelle, John Base.Google.com (or..all your base are belong to google), http://battellemedia.com/archives/001960.php, printed Nov. 3, 2005, 8 pages.

(Continued)

*Primary Examiner* — Yogesh C Garg (74) *Attorney, Agent, or Firm* — Lee & Hayes, PLLC (57) ABSTRACT

Collaborative structured tagging enables a community of users to define different types of tags for online content. The diverse tag types provide a non-flat or dimensional tagging data structure that supports navigation and search for content, as well as comparison of the content. In one implementation, the collaborative structured tagging is employed in an item encyclopedia that offers community-authored information on various items in one or more electronic catalogs. In this context, the collaborative structured tagging facilitates comprehensive cross-product comparison and dimensional product navigation.

31 Claims, 8 Drawing Sheets

U.S. PATENT DOCUMENTS

| | | |
|---|---|---|
| 2003/0055725 A1 | 3/2003 | Lee |
| 2003/0056222 A1 | 3/2003 | Iwata et al. |
| 2003/0182310 A1 | 9/2003 | Charnock et al. |
| 2004/0193506 A1 | 9/2004 | Zmolek |
| 2005/0055306 A1 | 3/2005 | Miller et al. |
| 2005/0065856 A1 | 3/2005 | Roberts et al. |
| 2005/0114789 A1 | 5/2005 | Chang et al. |
| 2005/0193010 A1* | 9/2005 | DeShan et al. ............. 707/104.1 |
| 2005/0203807 A1 | 9/2005 | Bezos et al. |
| 2005/0210392 A1* | 9/2005 | Koide et al. .................. 715/751 |
| 2005/0251384 A1 | 11/2005 | Yang |
| 2005/0256787 A1 | 11/2005 | Wadawadigi et al. |
| 2006/0031263 A1 | 2/2006 | Arrouye et al. |
| 2006/0041548 A1 | 2/2006 | Parsons et al. |
| 2006/0041553 A1 | 2/2006 | Paczkowski et al. |
| 2006/0190355 A1 | 8/2006 | Jammes et al. |
| 2006/0282304 A1 | 12/2006 | Bedard et al. |
| 2007/0033092 A1 | 2/2007 | Iams |
| 2007/0043742 A1 | 2/2007 | Arguello et al. |
| 2007/0078832 A1* | 4/2007 | Ott et al. ........................... 707/3 |
| 2007/0168179 A1 | 7/2007 | Markanthony et al. |
| 2007/0174247 A1* | 7/2007 | Xu et al. ........................... 707/3 |
| 2007/0208679 A1 | 9/2007 | Tseng et al. |
| 2007/0226077 A1 | 9/2007 | Frank et al. |
| 2007/0244756 A1 | 10/2007 | Stucki |
| 2008/0082416 A1 | 4/2008 | Kotas et al. |
| 2008/0091548 A1 | 4/2008 | Kotas et al. |
| 2008/0114644 A1 | 5/2008 | Frank et al. |
| 2010/0153364 A1 | 6/2010 | Kirby |

OTHER PUBLICATIONS

Hof, Robert et al., "Big Waves from 'Google Base'", http://www.businessweek.com/technology/contect/oct2005/tc20051027_587849, printed Mar. 1, 2006, 4 pages.

http://blog.outer-court.com/archive/2005-10-25-n57.html, printed Mar. 1, 2006, 2 pages.

http://www.flickr.com/photos/dirson/55908013, printed Nov. 3, 2005, 5 pages.

http://www.google.com/search?q=Google+Base, printed Nov. 3, 2005, 2 pages.

PCT International Search Report for PCT/US07/63203 dated Oct. 24, 2007.

U.S. Appl. No. 11/615,851, filed Dec. 22, 2006, Paul A. Kotas and Joseph C. Park, "Community-Based Selection of Online Advertisements".

Etsy, "Etsy: Your Place to Buy and Sell All Things Handmade" retrieved on May 4, 2010 at <<http://www.etsy.com/>>, 8 pages.

Linden, et al., "Amazon.com Recommendations: Item-to-Item Collaborative Filtering", Feb. 2003, 5 pgs.

Stewart, "The ABC's of Co-Ops", 18th Annual Ohio Employee Ownership Conf. Apr. 2004, 10 pgs.

Roy, et al., "Collaborative Product Conceptualization Tool Using Web Technology", Computers in Industry 41, Mar. 2000, pp. 195-209.

Translated the Chinese Office Action mailed Sep. 7, 2011 for Chinese patent application No. 200780007486.X, a counterpart foreign application of U.S. Appl. No. 11/537,446, 9 pages.

Non-Final Office Action for U.S. Appl. No. 11/537,218, mailed on May 11, 2011, Martin R. Frank, "Convergence of Terms Within a Collaborative Tagging Environment," 37 pages.

Non-Final Office Action for U.S. Appl. No. 11/276,539, mailed on Jul. 8, 2011, Martin R. Frank, "Collaborative Structured Tagging for Item Encyclopedias," 21 pages.

Beilenberg et al., "Groups in Social Software: Utilizing Tagging to Integrate Individual Contexts for Social Navigation", Master Thesis submitted Aug. 16, 2005, Bremen University, Bremen, Germany, 120 pages.

Guan et al., "Intelligent product brokering for e-commerce: an incremental approach to unaccounted attribute detection" Electonic Commerce Research and Applications 3 (2004) pp. 232-pp. 252.

Final Office Action for U.S. Appl. No. 11/537,218, mailed on Oct. 20, 2011, Martin R. Frank, "Convergence Of Terms Within A Collaborative Tagging Environment", 38 pages.

Translated copy of the Chinese Office Action mailed Oct. 28, 2011 for Chinese patent application No. 200780007501.0, a counterpart foreign application of U.S. Appl. No. 11/276,539, 9 pages.

* cited by examiner

COLLABORATIVE STRUCTURED TAGGING FOR ITEM ENCYCLOPEDIAS

BACKGROUND

Companies often face unique problems when trying to sell products over the Internet. Unlike traditional brick-and-mortar businesses, e-commerce companies do not have a physical store or location where a salesperson can help both novice and knowledgeable customers find sought after products. In the web environment, it is the customer's responsibility to identify a product that meets his or her needs. Even customers with considerable experience navigating e-commerce websites sometimes find it difficult to locate a desired product from among hundreds or thousands of offered products. For novice customers, the task of shopping online via the web can be unproductive and even frustrating.

Companies with e-commerce websites continue to look for ways to make their websites more dynamic, compelling, and easier for users to navigate and locate products. Today, e-commerce websites commonly serve pages with rich images of products and corresponding product descriptions. Unfortunately, there is little consistency among the many ways that products can be described. Product descriptions are often left to the manufacturer or distributor of the products, and hence, the terms and attributes used to describe those products are typically not uniform. For instance, different manufacturers or retailers of digital cameras may characterize zoom attributes or image capture modes in any number of different ways. This non-uniformity can make it difficult for users to locate products, compare similar products, or understand the differentiating features when considering a purchase decision.

Moreover, finding a particular product or set of similar products on a website can be challenging, especially for websites offering a very large number of products. Many websites offer search mechanisms (e.g., such as keyword search engines) that allow users to input descriptive terms for items of interest. Regrettably, due in part to the inconsistency of how the products are initially defined, it is not uncommon for search mechanisms to return one of two extremes: (1) zero product hits or (2) hundreds of product hits with varying degrees of relevance. In the case of many product hits, it is up to the customer to sort through the results, which can be unproductive and annoying.

One way of making product search simpler and more robust is through further advancing textual search technology. However, this approach inherently burdens the searching customer with the task of identifying comparable products among the search results, and with the task of then extracting and normalizing the values of the most important product attributes. Another approach to improve searchability is to improve consistency in the product descriptions by asking manufactures and merchants to describe their products with a certain level of particularity. For example, an e-commerce company may ask a manufacturer or merchant to describe its products using attributes and values that can be added to a searchable index connected to a product search mechanism. However, this manual process is time-intensive and costly to implement.

Accordingly, there remains a need for improving navigation of e-commerce websites and the ability for users to locate and compare desired products.

SUMMARY

Collaborative structured tagging enables a community of users to define different types of tags for online content. The diverse tags are associated with one another to form a non-flat or dimensional tagging data structure that supports navigation, search for content, and content comparison. In one implementation, the collaborative structured tagging is employed in an item encyclopedia that offers community-authored information on various items in one or more electronic catalogs. In this context, the collaborative structured tagging facilitates comprehensive cross-product comparison and dimensional product navigation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to collaborative structured tagging for tagging content made available over the Internet. As an overview, collaborative structured tagging enables a community of users to define and assign different types of tags to the content. Tags are pieces of information separate from, but related to, the content. In the collaborative environment, the tags are descriptors freely chosen by different users to characterize or otherwise describe attributes of the content, rather than having the description controlled by a centralized classification process. With this freedom, the tags can specify properties of an item that may not otherwise be obvious from the item itself. The different types of tags are associated with one another to form a non-flat or dimensional tagging data structure that supports navigation, content searching, and content comparison.

In one implementation, the dimensional tagging data structure is employed in a collaboratively-defined item encyclopedia that describes items offered in electronic catalogs. Through collaborative effort, users author descriptions of new items or edit existing item descriptions authored previously by themselves or others. As a result, the item descriptions become more accurate and uniform over time, thereby improving the user's ability to find items of interest on the website. Further, users are empowered to define tags that characterize the items and identify attributes of the items. Over time, the collaboratively defined tags form a folksology (an attributed folksonomy) to categorize the items offered in the catalog. Once assigned to items, the tags may be used to locate and organize the items, as well as facilitate comparison of various items.

For purposes of discussion, the collaborative structured tagging is described in the context of an electronic catalog hosted by a merchant website. One exemplary implementation of this environment is provided below. However, it should be appreciated that the collaborative structured tagging may be implemented in other environments.

Example System Architecture

Figure 1:
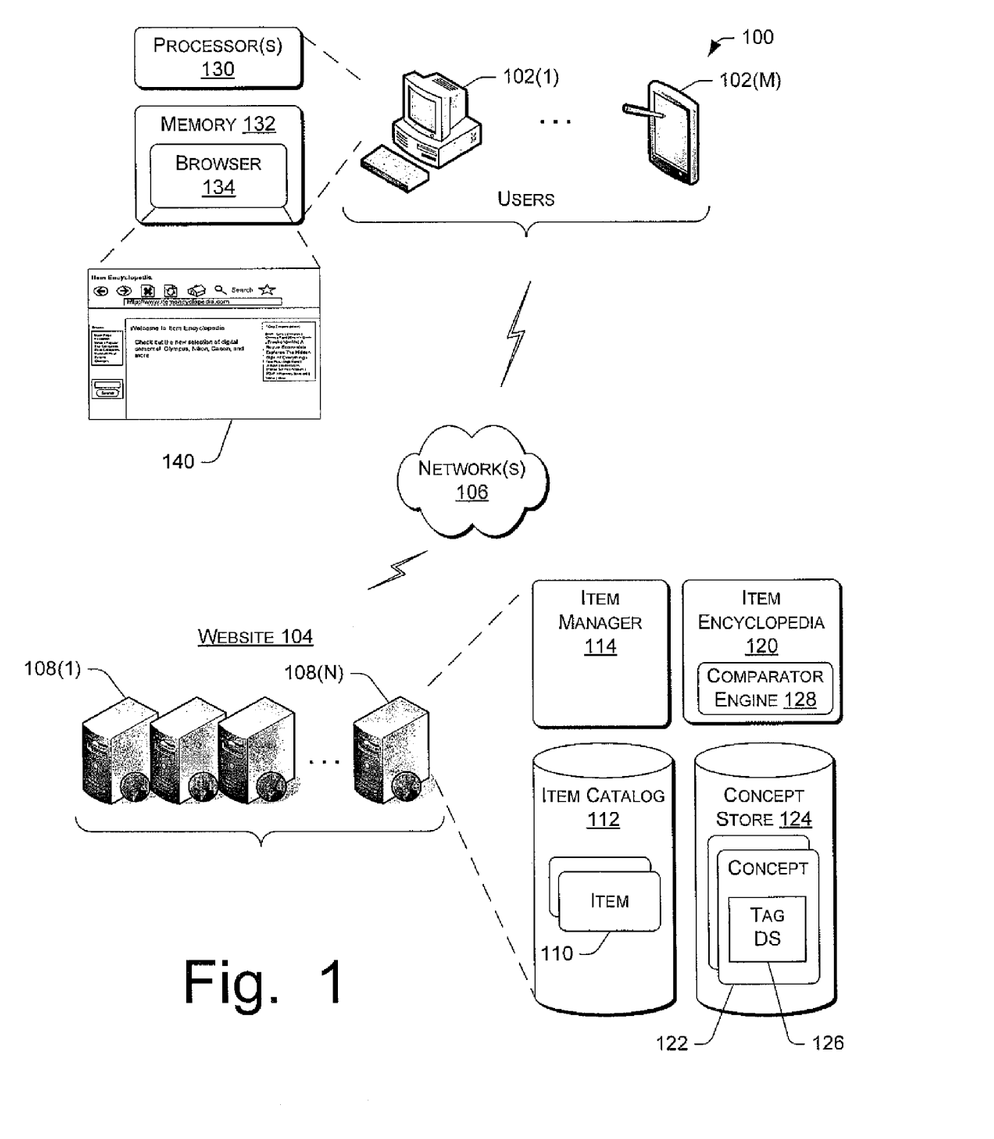
FIG. 1 illustrates an example architecture for implementing an item encyclopedia via collaborative structured tagging. The network environment includes multiple clients coupled via a network to a server system that hosts an electronic catalog of items referenced by the encyclopedia.

FIG. 1 illustrates an example architecture 100 in which collaborative structured tagging many be implemented. In architecture 100, many user computing devices 102(1), ..., 102(M) can access a website 104 via a network 106. The network 106 is representative of any one or combination of multiple different types of networks, such as cable networks, the Internet, and wireless networks.

The website 104 is hosted on one or more servers 108(1), ..., 108(N), perhaps arranged in a cluster or as a server farm. Other server architectures may also be used to host the site. The website 104 is capable of handling requests from many users and serving, in response, various web pages that can be rendered at the user computing devices 102(1)-102(M). The website 104 can be essentially any type of website that supports user interaction, including online retailers, informational sites, search engine sites, news and entertainment sites, and so forth.

In the exemplary environment, the website 104 is representative of a merchant website that hosts an electronic catalog with one or more items. An item can be anything that the merchant wishes to offer for sale, or that others using the merchant's website wish to offer for sale. An item can include a product, a service, or some other type of sellable unit.

In FIG. 1, a collection of item records 110 are stored in an item catalog database 112, which is accessible, directly or indirectly, by one or more of the servers 108(1)-108(N). Each item record 110 contains information about an associated item being offered for sale on the website 104. For products such as books or music CDs, for example, the item record may contain a description, images of the product, author/artist names, publication data, pricing, shipping information, and so forth. For other types of items, the item record may contain different information appropriate for those items.

An item manager 114 facilitates access to and management of the item records 110 in the catalog 112. The item manager 114 allows the website operators to add or remove items to the catalog 112, and generally maintain control of the items offered on the website 104. When a user requests information on an item from the website 104, one or more servers 108 retrieve the item information from the item catalog 112 and serve a web page containing the information to the requesting user computing device. The database 112 may therefore contain static web pages that are pre-generated and stored prior to such requests, or alternatively store data that is used to populate dynamic web pages that are generated in response to such requests.

The website 104 may also host an item encyclopedia 120 to offer rich authoritative information on the various items in the catalog. The item encyclopedia 120 facilitates creation of articles about the items in the catalog. These articles may include any information helpful to a user in learning about the item and deciding whether to purchase the item. Such information may include descriptions of the items, features and specification data, images of the item, intended uses, identities of manufacturers or distributors, accessories, and so on. These articles can be served by the servers 108 to the users to assist the users in better understanding the items.

In one implementation, the encyclopedia articles are community-authored, where any number of users may add, modify, or delete content contained in the encyclopedia. Thus, individual users can define new items being offered in the catalog, and also edit articles crafted by other users. The edits can be logged and monitored to prevent malicious entries. Discussion pages, review history, and even the ability to watch pages may further be supported by the item encyclopedia 120.

The item encyclopedia 120 also supports tagging of the items with tags to assist in navigation, search, and comparison. These tags may be assigned by the manufacturer or supplier of the items, the website operator, or any member of the community. The tagging is free-form in that anyone can add any tag just by typing, akin to tagging on websites such as "del.icio.us" and "flickr.com". But, unlike flat tagging approaches used by such websites, the tags are applied within a non-flat or dimensional data structure having multiple different kinds of tags. This structure enables cross-product comparison and dimensional product navigation. In the described implementation, the tagging structure includes category tags and associated fact tags, as will be described below in more detail with reference to FIG. 2.

The articles and tags are stored as concept objects 122 in a concept store 124. The concepts 122 are objects with metadata corresponding to the items represented in the catalog 112. Individual concepts 122 include a tagging data structure 126 that supports tagging of the items or other content made available online.

Figure 2:
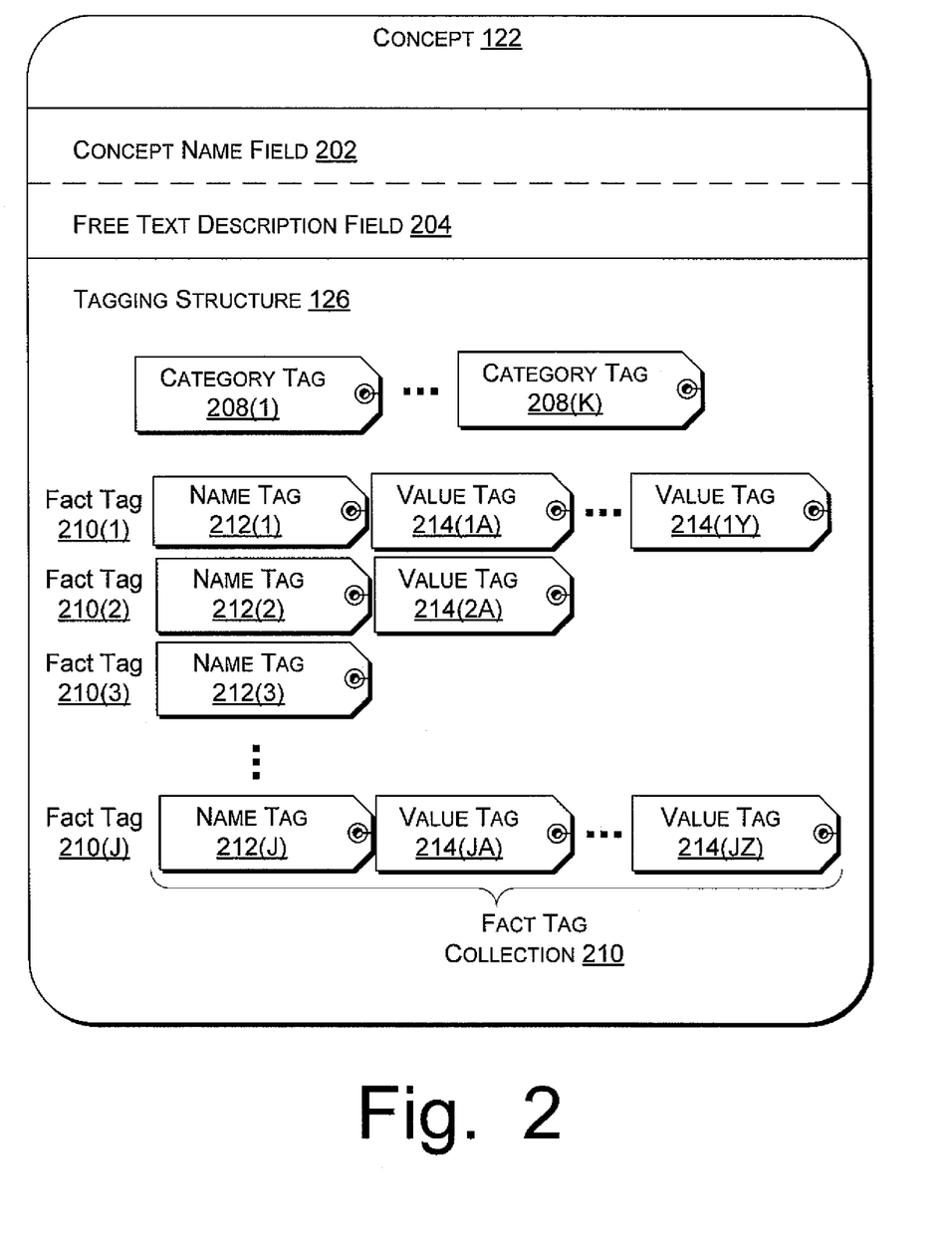
FIG. 2 illustrates an example implementation of a concept object that maintains a tagging data structure used in the collaborative structured tagging.

FIG. 2 illustrates one example implementation of a concept object 122. The concept 122 includes a concept name field 202, a free text description field 204, and the tagging data structure 126. The concept name field 202 contains a unique name of the concept for purposes of identifying the concept. The free text description field 204 allows users to enter a description of the concept, the associated item, or both.

The tagging data structure 126 associates multiple tags including one or more first or category tags 208(1)-208(K) and one or more collections of second or fact tags 210(1)-210(J). The category tags 208(1)-208(K) characterize the items in terms of generic or objective categories. For instance, suppose that the item is an Olympus® brand digital camera sold by the Olympus Corporation. In this example, a category tag might be "digital camera".

The facts tags 210(1)-210(J) are associated with the concept 122 and provide facts about the catalog item represented by the concept 122 in the item encyclopedia. For each category tag 208(1) through 208(K), there is a set of zero or more fact tags 210 associated with describing the item in the way in which the stated category are typically described. For example, suppose the item is a camping tool with an integrated flashlight and compass. The item may be tagged with two category tags, such as "Flashlight" and "Compass". The fact tags describing the attributes of the item might include one set of fact tags pertaining to the flashlight aspects of the item and another set of facts pertaining to compass aspects of the item. Thus, associated with the category tag "Flashlight", the concept 122 may include fact tags for the item with a name:value of "Batteries Needed: 4 AA". For the category tag "Compass", the concept 122 may included fact tags for the item with a name:value of "Magnetic Sensitivity: High".

Each of the fact tags 210(1)-210(J) has a name portion 212 to identify an attribute of the item and one or more corresponding value portions 214 that provide one or more values of the attribute identified by the name portion. Said differently, each fact tag has a name:value pair, where there may be more than one value for each name. Moreover, the name portion 212 and the value portion(s) 214 are also tags.

Thus, each fact tag is composed of a collection of one name tag and zero or more value tags. In FIG. 2, the first fact tag 210(1) is composed of one name tag 212(1) and multiple value tags 214(1A)-214(1Y). For instance, is the digital camera example, the name tag might be "color" and the value tags might be "silver", "black", and "white". The first fact tag 210(1) is an example of a multi-part fact tag, where there are one or more value tags 214(1A)-214(1Y) associated with the name tag 212(1). The second fact tag 210(2) is composed of one name tag 212(2) and one value tag 214(2A). Here, the name tag might be "weight" and the value tag might be "4.52 oz (128 grams)". The second fact tag 210(2) is also representative of a multi-part fact tag in that it has at least one name tag 212(2) and at least one value tag 214(2A). The third fact tag 210(3) is composed of just one name tag 212(3) and no value tags. In this case, the name tag might be "weatherproof", where presence of the name tag would suggest that the item is weatherproof, and absence of the name tag would suggest that it is not. This third fact is representative of a singleton fact tag, where there are no value tags associated with the name tag 212(3). Over time, the collaboratively defined tags form a folksology to categorize the items offered in the catalog.

From one perspective, the tagging structure may be considered dimensional in that the category tags define what the item is and the fact tags, in the context of the category tags, define attributes or features of the item as characterized by the category tags. Further, the attribute or name tags are associated via the structure with one or more value tags. The tagging structure thereby provides relationships among terms that enable many useful functions for the user when exploring features of a product. Unlike previous flat tag approaches, where there is no distinction between category or fact tags, or between name tags and value tags, the non-flat tagging structure 126 allows users to easily compare multiple items according to a category selected by the user. With the flat tag approach, there is no way to describe the nature of a relationship between the tags.

For instance, suppose the user would like to compare all "digital cameras" in the item catalog. The user simply selects this category tag and all items tagged with this category tag are located, and then the related fact tags of "color" and "weight" associated with the category tag of "digital camera" are easily arranged for convenient observation. For instance, the name tags are aligned horizontally, with associated value tags grouped vertically beneath their corresponding name tags. A more detailed example, along with an exemplary UI, is provided below with reference to FIG. 5. In contrast, with a flat tag structure, where there is no distinction between digital camera, color, and weight, there is no way for the system to understand how to align the attributes upon selection of "digital camera". Furthermore, since there are no name:value pairs in the flat tag approach, there is no context for a comparison. The system has no context for how to compare "color" since there is no value associated with "color" in a flat tag approach.

It is noted that the concept object 122 shown in FIG. 2 is merely representative. Other data or content may be included. For instance, if the website supports other services, such as a chat or discussion forum that allows user to talk about the items, then the concept 118 may also include associated content that may be used in this forum.

With reference again to FIG. 1, the item encyclopedia 120 allows users to collaboratively define tags for the items in the item catalog 112. The user-defined tags are added to the tagging data structure 126 as part of the concept objects 122. Once the items are tagged, the encyclopedia 120 may use the category and fact tags to locate and organize the items. For instance, a user may select a category tag "digital camera" (e.g., via a search engine or upon clicking a tag titled "digital camera" on a page). In response, the encyclopedia 120 finds all concepts 122 having a category tag of "digital camera" in the tagging structure 126 and returns a listing of these concepts. From these identified concepts, the item manager 114 may locate the items 110 which are presumably digital cameras.

The item encyclopedia 120 further includes a comparator engine 128 to facilitate comparison of various items based on the tags in the tagging structure 126. A user may request to compare all products with a category tag of "digital cameras" and a fact tag of "weight". The comparator engine 128 would retrieve those concepts with the category tag and fact tag, and order them accordingly in a presentation for the user's review. One particular approach to comparing items will be described below in more detail.

While the tagging structure 126 is shown implemented in conjunction with an item encyclopedia, it is noted that the tagging structure may be implemented in other context where a content manager is used to manage content to be served via a website. It is further noted that the electronic catalog and encyclopedia need not be hosted by the same website (as illustrated in FIG. 1 for simplicity of discussion), but instead may be provided as separate services residing on different server systems. For instance, the item encyclopedia may be a service hosted by a separate website that integrates with one or more other merchant websites.

The user computing devices 102 (also referred to as "client computers" or simply "clients") may be implemented as any number of computing devices, including as a personal computer, a laptop computer, a portable digital assistant (PDA), a cell phone, a set-top box, a game console, and so forth. Each user computing device 102 is equipped with one or more processors 130 and memory 132 to store applications and data. A browser application 134 is shown stored in memory 132 and executes on a processor 130 to provide access to the website 104. The browser 134 renders web pages served by the website 104 on an associated display.

When a user accesses the website 104, the client 102 submits a request typically in the form of a uniform resource locator (URL) to the servers 108. Upon receiving the request, the servers 108 return a web page back to the requesting client computer. In the context of a merchant website, the web page may include one or more items of interest to the user. The web page may alternatively or additionally include item information, such as articles and tags, which is collaboratively defined by the community of users to provide more extensive information than what might otherwise have been provided by the seller, manufacturer, or website operator. The user computing device uses the browser 134 to render the web page, allowing the user to interact with the web page. In FIG. 1, the browser 134 is shown rendering a web page 140. In this illustration, a home page for the item encyclopedia is displayed.

Collaborative Structured Tapping

The website 104 provides both an item catalog as well as a community-defined item encyclopedia to provide an enriched user experience. In support of the catalog and encyclopedia, the website 104 supports collaborative structured tagging that, in part, makes it easier for users to navigate the item catalog, locate the precise items of interest, and compare those items with other similar items. To better illustrate the user experience provided by the collaborative structured tagging, FIGS. 3-8 show renderings of various web pages served by the website 104. In this example, the item is a digital camera. Furthermore, this example is described in the context of a community-defined item encyclopedia. It is noted that other formats and services may employ collaborative structured tagging to enhance user experience while searching for content on the Internet.

Figure 3:
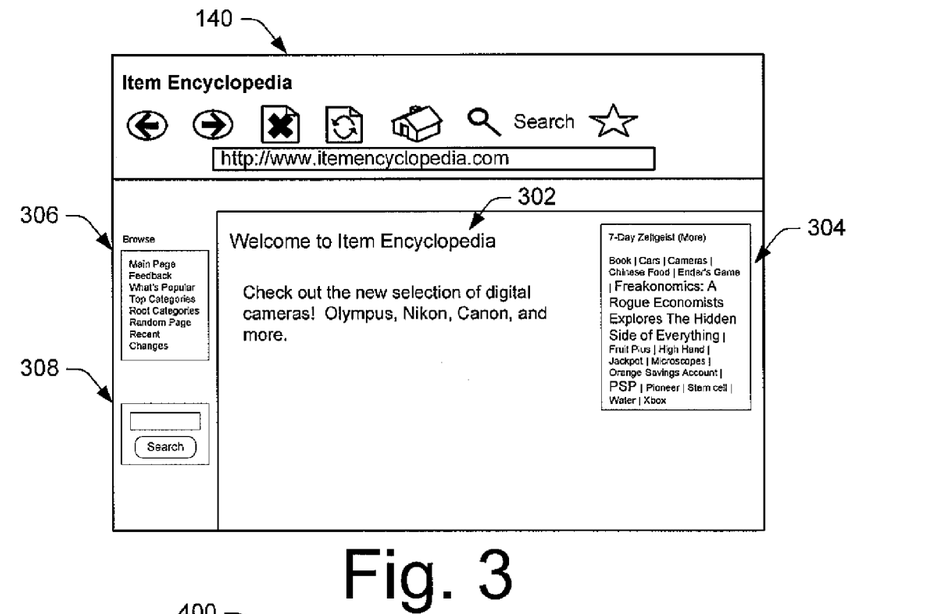
FIG. 3 illustrates a screen rendering of an exemplary home page for the item encyclopedia.

FIG. 3 shows a home page 140 for the item encyclopedia, which might be served and rendered, for example, when the user first accesses the website 104. The home page 140 includes a welcome pane 302 with a greeting. The home page might also contain other controls or navigation tools, such as a zeitgeist 304 listing the most popular or interesting tags over the past seven day period, a list of navigation links 306, and a search tool 308. The home page may further include reference to any new items that have been added to the catalog or highlight promotions.

The home page 140 may also provide controls to assist users in creating new articles for the encyclopedia. For example, the home page 140 may provide a "click to create" entry in the search results, and a "create something like this" entry on product and category pages.

The search tool 308 allows the user to locate items in the item catalog or articles from the encyclopedia about the items. By entering one or more key terms, users can search on category tags, fact tags, titles, and the free text of articles in the encyclopedia. If an item exists, the website serves a webpage with information about the item. Suppose the user is interested in exploring digital cameras. In particular, the user wants to learn more about the Olympus® Stylus 800 digital camera. The user might enter the terms "Olympus", "Stylus", and "800" into the search tool 308. The user may also access the web page by following links on the homepage or the tags in the zeitgeist 304.

Figure 4:
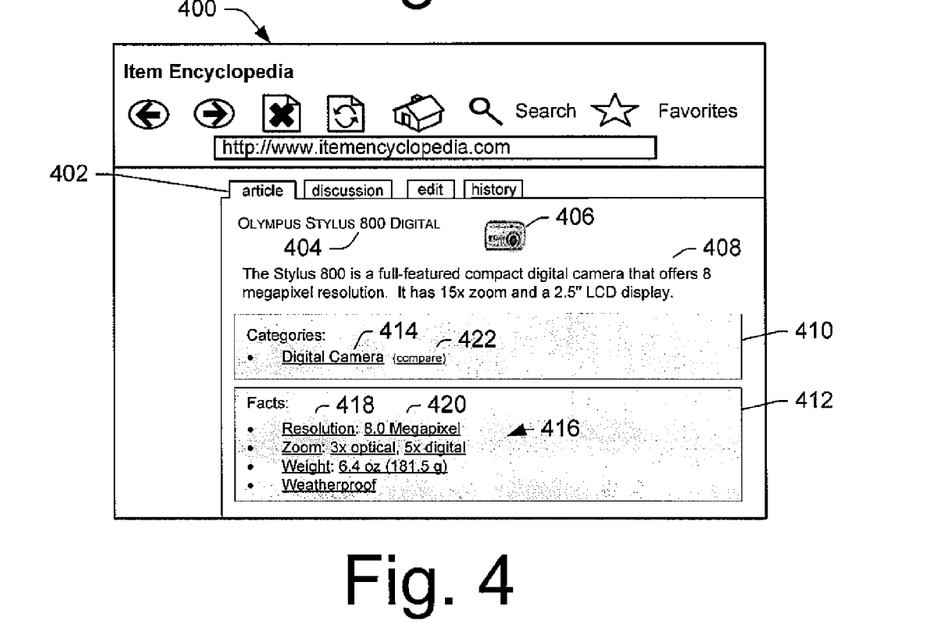
FIG. 4 illustrates a screen rendering of an exemplary article page in the item encyclopedia.

FIG. 4 shows a rendering of web page 400 served in response to a user's request for information on the digital camera. In page 400, the "article" tab 402 is selected to present an informative article of the digital camera that was drafted by the manufacturer, retailer, or a user in the community. The article includes a name of the item 404 (i.e., "Olympus Stylus 800 Digital") along with an image 406 of the camera. A description 408 resides just below the item name 404 and image 406, although other layouts may be used. The description 408 may be an original description provided by the manufacturer, or a description crafted by the website operator, or information given by a user in the community. Moreover, the description may represent several iterations authored by multiple users in the community.

The article page 400 also has a category section 410 and a fact section 412 located beneath the description 408. The category section 410 lists one or more category tags to which the item may belong. In this example, the item belongs to the category "digital camera" and is represented on the page by a selectable category tag 414 (as illustrated with underlining, although in practice the tag may be represented using other techniques, such as color variation). The contents for the category tag are provided by the category tag field(s) 208(1)-208(K) in the tagging structure 126 of the concept 122 (See FIG. 2).

It is noted that other items maintained in the item catalog may have more than one category tag. For instance, an item titled "XYZ Radio Alarm Clock" may have multiple category tags, including one for the category "Radio" and one for the category "Alarm Clock".

The fact section 412 contains one or more fact tags 416 that are associated with the category tag 414 for the item. Each fact tag 416 has a name portion 418 identifying an attribute of the item and one or more corresponding value portions 420 providing one or more values of the attribute identified by the name portion 418. For instance, in FIG. 4, the first fact tag has a name portion "Resolution" to identify the resolution attribute of the digital camera and a value portion "8.0 Megapixel" to provide the value of the resolution attribute named "Resolution". The second fact tag in the facts section 412 has a name portion "Zoom" to identify the zoom attributes of the digital camera and multiple value portions of "3× optical" and "5× digital". The third fact tag has a name portion "Weight" to identify the weight of the camera and one value portion "6.4 oz (181.5 g)" to provide the value. Fact tags such as these, with at least one value tag for each name tag, are referred to as multi-part fact tags. The fourth fact tag in the facts section 412 has a name portion "Weatherproof" and no corresponding value portion. This fourth fact tag is an example of a singleton fact tag, where no value is provided for the corresponding attribute.

Notice also that both the name portion 418 and value portion 420 of the fact tags 416 are tags. This is illustrated by the underlining beneath the words. Thus, each fact tag is composed of multiple tags, including one name tag and zero or more value tags associated with the name tag. Each tag is independently selectable. In this manner, the each fact tag can be thought of as a collection of associated tags.

Users are able to add new category and fact tags within the rules governing the community. For example, a user may wish to add the category tag "video camera" since the digital camera is capable of recording short video clips. Once added, the category section 410 would include this new category tag next time a user requests the article page 402. Furthermore, users can easily add fact tags for an item as a way to highlight different attributes and values. For instance, in FIG. 4, a user might be compelled to add fact tags to physical dimensions, color, capture modes, and so forth.

Users can efficiently and easily navigate through articles using the tags. For instance, users might navigate from a fact tag to the articles that use it and vice versa, or perhaps from a category tag to articles of that category and vice versa. Selection of anyone of the tags results in a new article page. For example, when the user selects the "resolution" tag in the fact section 412, an article page entitled "Resolution" is presented. The "Resolution" article page may have a description (akin to description 408) describing the term "resolution" as used in the context of digital cameras, if a user in the community has taken time to draft this article. Additionally, new categories are presented in category section 410 and new facts are listed in fact section 412, assuming again that a user has taken time to add these tags.

As further shown in FIG. 4, the rendered web page 400 allows the user to make comparisons. In this example, the user is given the option of comparing digital cameras by selecting a "compare" link 422 located adjacent the "digital camera" category tag 414. Upon selection of this compare link, the servers 108 locate other items in the item catalog that have been tagged with the category tag "digital camera" and present the results to the user. It is noted that other tags may be used in the comparison feature, including category, name, and value tags.

Figure 5:
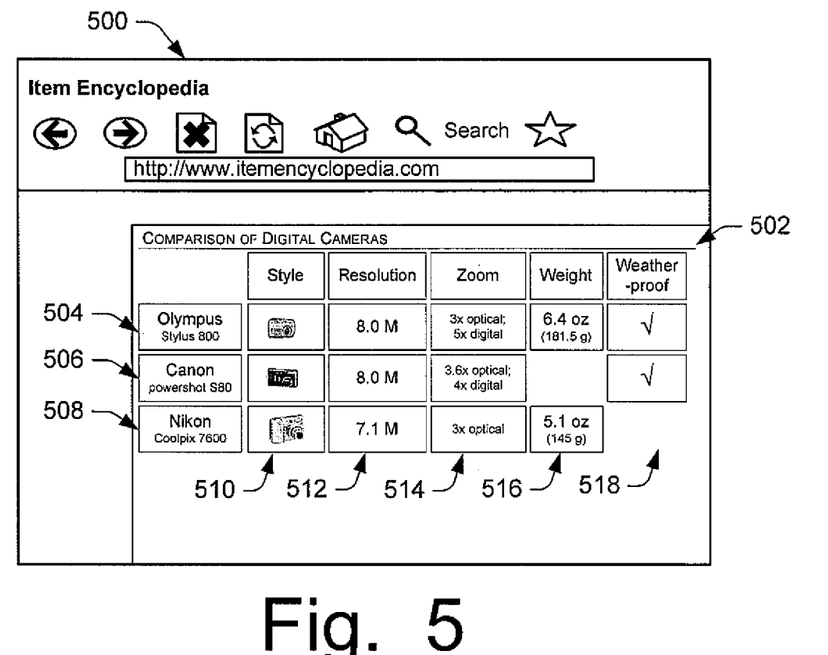
FIG. 5 illustrates a screen rendering of an exemplary comparison page to compare items described by the item encyclopedia.

FIG. 5 shows a rendering of web page 500 served in response to the user's selection of the "compare" feature 422 in web page 400 (FIG. 4). In page 500, a comparison of all items with a category tag of "digital camera" is presented to the user to assist in learning more about an item and/or making a more informed decision prior to purchase. In the illustrated example, the results are presented in a table or chart 502 where items being compared are arranged in rows, with each column providing a comparison of an attribute of interest. Here, three digital cameras were identified as having a "digital camera" category tag: an "Olympus Stylus 800" digital camera provided in row 504, a "Canon PowerShot S80" digital camera in row 506, and a "Nikon Coolpix 7600" digital camera in row 508.

Various attributes to compare the digital cameras are arranged in columns 510-518. More specifically, an image showing the styling of the cameras is provided in column 510 to afford a visual cue of the camera. The remaining columns 512-518 present the fact tags associated with the category tag "digital camera" for those items in the comparison table 502. Here, the pixel count is provided in column 512, the zoom attribute is provided in column 514, the weight is in column 516, and the weatherproof attributes is provided in column 518.

In one implementation, the fact tag columns may be ordered or otherwise ranked according to pre-determined criteria, such as relevance of the facts within each item. For instance, if every item has a fact tag "Resolution" that is prominent in its own article page, the column 512 comparing pixel counts may be ordered higher in comparison to other facts. One exemplary ranking process is described below with reference to FIG. 11.

Since users define the articles and tag the items, there may not be uniformity across all items being compared. In this example, the concept object associated with the "Canon" digital camera in row 506 does not have a fact tag for "weight". This might be because the manufacturer does not release the information, or the manufacturer or a user in the community has never tagged this item with a weight. Hence, there is no entry in column 516 for the "Canon" digital camera. Similarly, there is no "weatherproof" fact tag for the "Nikon" digital camera. However, all three items have associated fact tags for "Resolution" and "Zoom".

Deciding which terms are used in the category and fact tags is driven by the community over time, and perhaps in cooperation with the website operator. Thus, when one user enters the fact name "Weight" and another user employs the fact name "Bulk", the community of users (and/or the website operator) eventually drives the vocabulary to consistently use one term or the other.

The website may further support discussion about the items in the catalog. As shown again in FIG. 4, a "discussion" tab may be selected when the user wishes to talk about the item.

Figure 6:
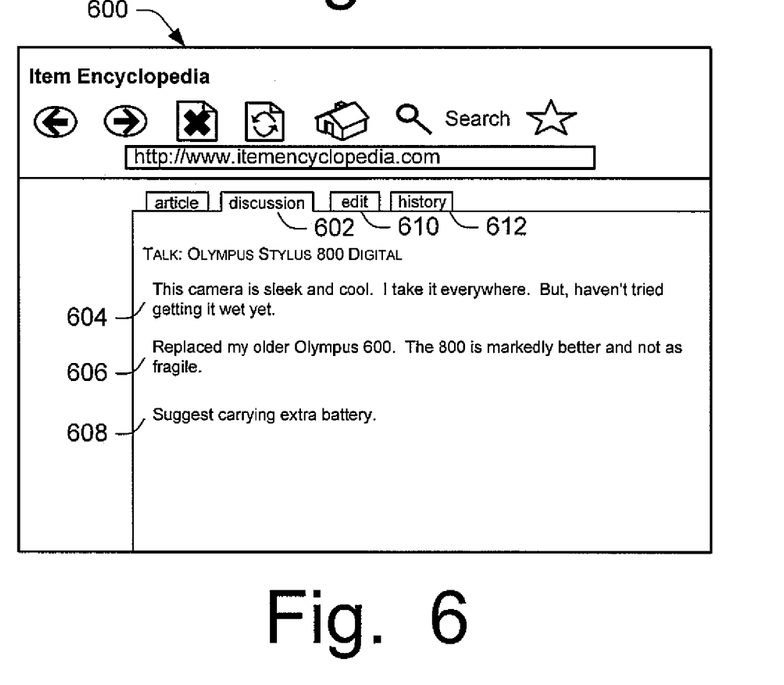
FIG. 6 illustrates a screen rendering of an exemplary discussion page in the item encyclopedia.

FIG. 6 shows a rendering of a web page 600 served in response to the user's selection of the "discussion" tab 602. The discussion page is titled "Talk: Olympus Stylus 800" to let users in the community discuss this particular digital camera. Several discussion entries 604, 606, and 608 are shown in the page.

Figure 7:
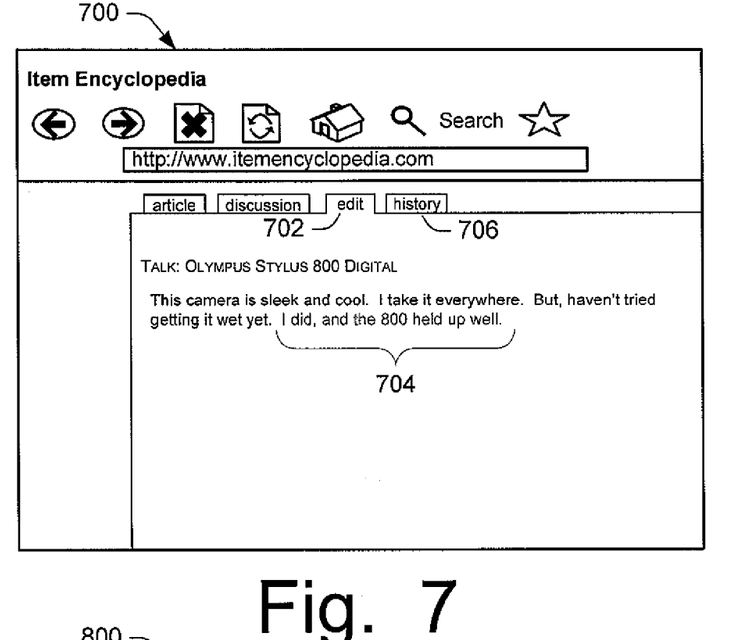
FIG. 7 illustrates a screen rendering of an exemplary edit page in the item encyclopedia. Through the edit page, the user is able to edit the article or discussion.

An edit tab 610 allows the user to edit the discussion, articles, or tags. FIG. 7 shows a rendering of a web page 700 after the user selects the "edit" tab 702. Here, the user adds the sentence 704 (i.e., "I did, and the 800 held up well.") to existing text in a discussion. With the edit functions, users can add or correct text and tags without having to learn any special syntax.

Figure 8:
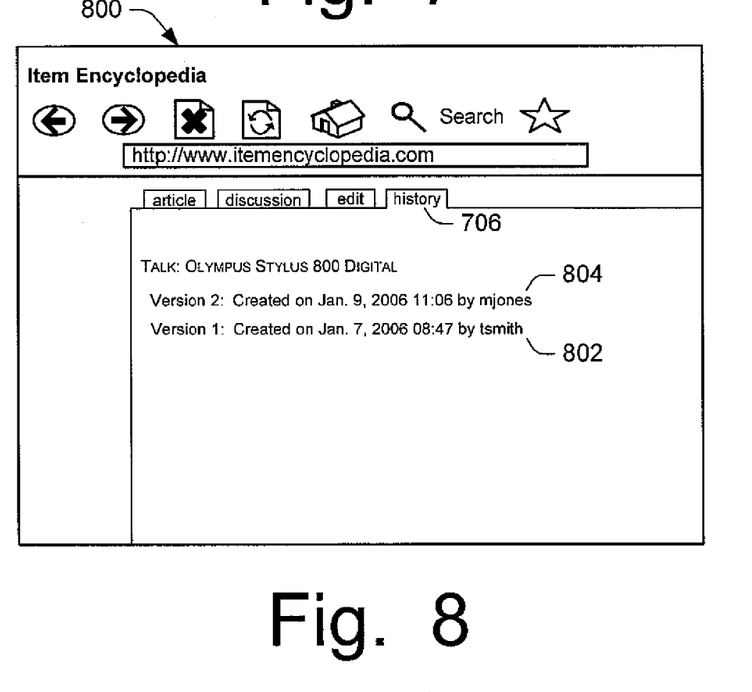
FIG. 8 illustrates a screen rendering of an exemplary history page in the item encyclopedia, which is used to track edits made to the article or discussion.

A history of such edits is tracked by the encyclopedia. A user can view the edit history by selecting the "history" tab 706. FIG. 8 shows a rendering of a web page 800 in response to selection of the "history" tab 706. In this example, there have been two postings on this discussion, a first version 802 posted by "tsmith" and a second version 804 posted later by "mjones".

Item Manager Implementation

Figure 9:
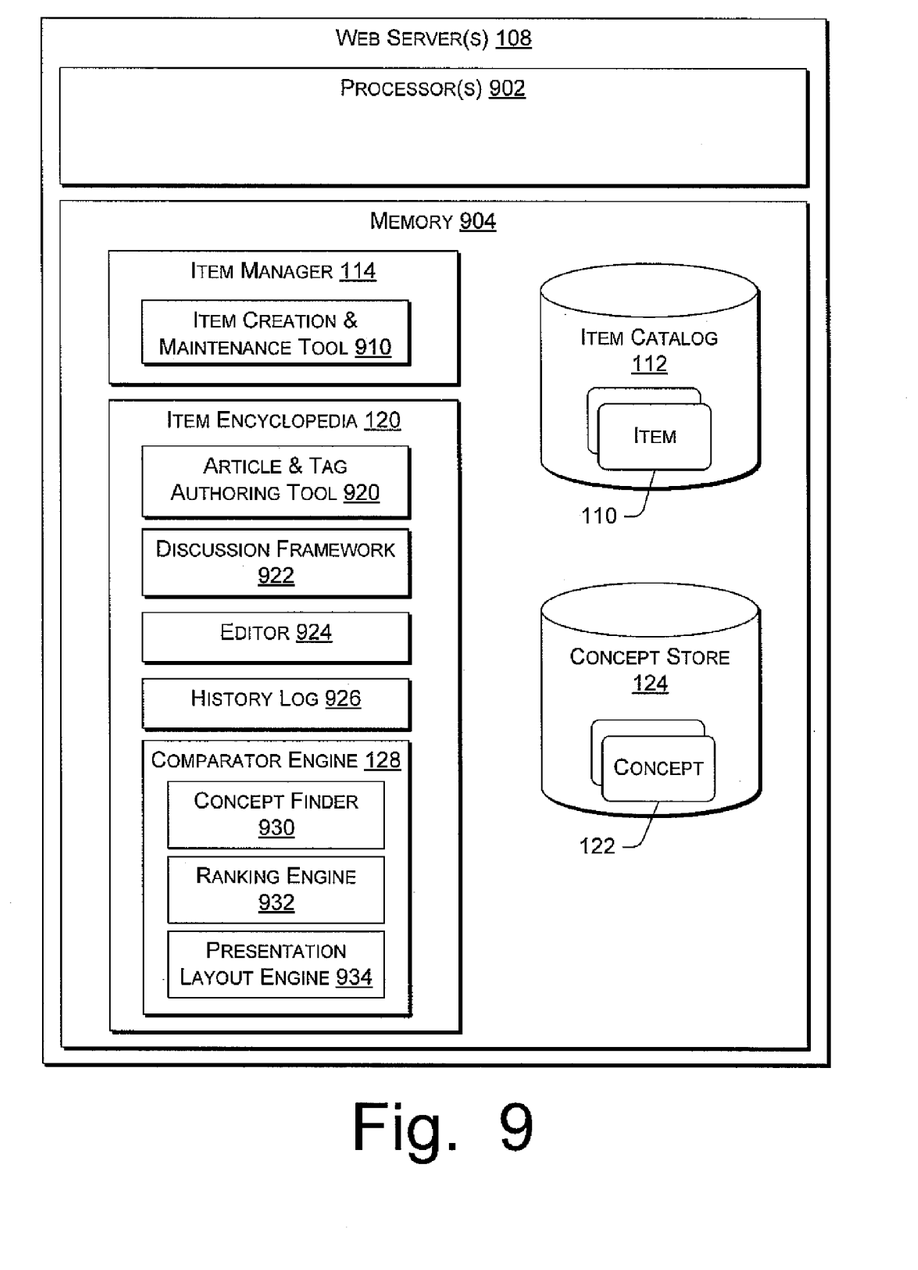
FIG. 9 is a block diagram illustrating modules in the item manager and item encyclopedia.

FIG. 9 illustrates an example implementation of the item manager 114 and item encyclopedia 120 that is run as software on one or more of the web servers 108(1)-108(N). The web servers have processing capabilities and memory suitable to store and execute computer-executable instructions. In this example, the web server(s) 108 include one or more processors 902 and memory 904. The memory 904 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The item manager 114 and item encyclopedia 120 are implemented as software or computer-executable instructions stored in a memory 904 and executed by one or more processors 902. The item manager 114 includes an item creation and maintenance tool 910 to facilitate creation and maintenance of item records 110 in the item catalog 112. Such items may be created and posted by the website operator (e.g., an owner of a merchant website), the manufacturer, distributor, retailer, or any one in the user community.

The item encyclopedia 120 facilitates creation and management of the concept objects 122 maintained in concept store 124. The encyclopedia 120 includes an article and tag authoring tool 920 that enables users to author articles describing the items 110 in the item catalog 112. Users are further enabled to tag the items with category and fact tags. In this manner, the article and tag authoring tool 920 produces a concept object 122 that contains the articles, tags, and other item metadata. An example concept 122 is illustrated and described in more detail with reference to FIG. 2.

The item encyclopedia 120 may also be implemented with a discussion framework 922 to facilitate user discussion of the products. The discussion framework allows users to enter and post their commentary. The framework 922 then formats the commentary for presentation to the user, as well as allowing a mechanism for other users to offer feedback on the commentary. An editor tool 924 facilitates user-based editing of the description provided in the encyclopedia articles and/or the commentary supported by the discussion framework 922. For example, when viewing an article or discussion about the item, a user may enter edits by selecting the "edit" tab 702 on the UI (FIG. 7). The editor tool 924 receives the edit, formats it, and presents it with the original text, as illustrated in FIG. 7.

Returning to FIG. 9, the item encyclopedia 912 has a history log 926 to track the changes entered by the community of users. A summary of the history log 926 can also be presented to the users as illustrated, for example, in FIG. 8.

The comparator engine 128 facilitates comparison of the items based on the category and fact tags. Comparisons can be made for items with the same category tags or the same fact tags. In one implementation, the comparator engine 128 includes a concept finder 930, a ranking engine 932, and a presentation layout engine 934. When the user wishes to compare similarly tagged items (e.g., a "digital cameras" category tag), the concept finder 930 locates the concepts 122 in the concept store 124 with the same tags. The ranking engine 932 gathers all of the fact tags for the set of found concepts and orders them according to some criteria (e.g., relevance, coverage, etc.). The presentation layout engine 934 builds a graphical layout for presentation of the ranked results. An example web page with a chart layout presenting a comparison of digital cameras is shown in FIG. 5. A more detailed discussion of how the comparator engine operates, along with an example, is provided below with reference to FIG. 11.

Operation

Figure 10:
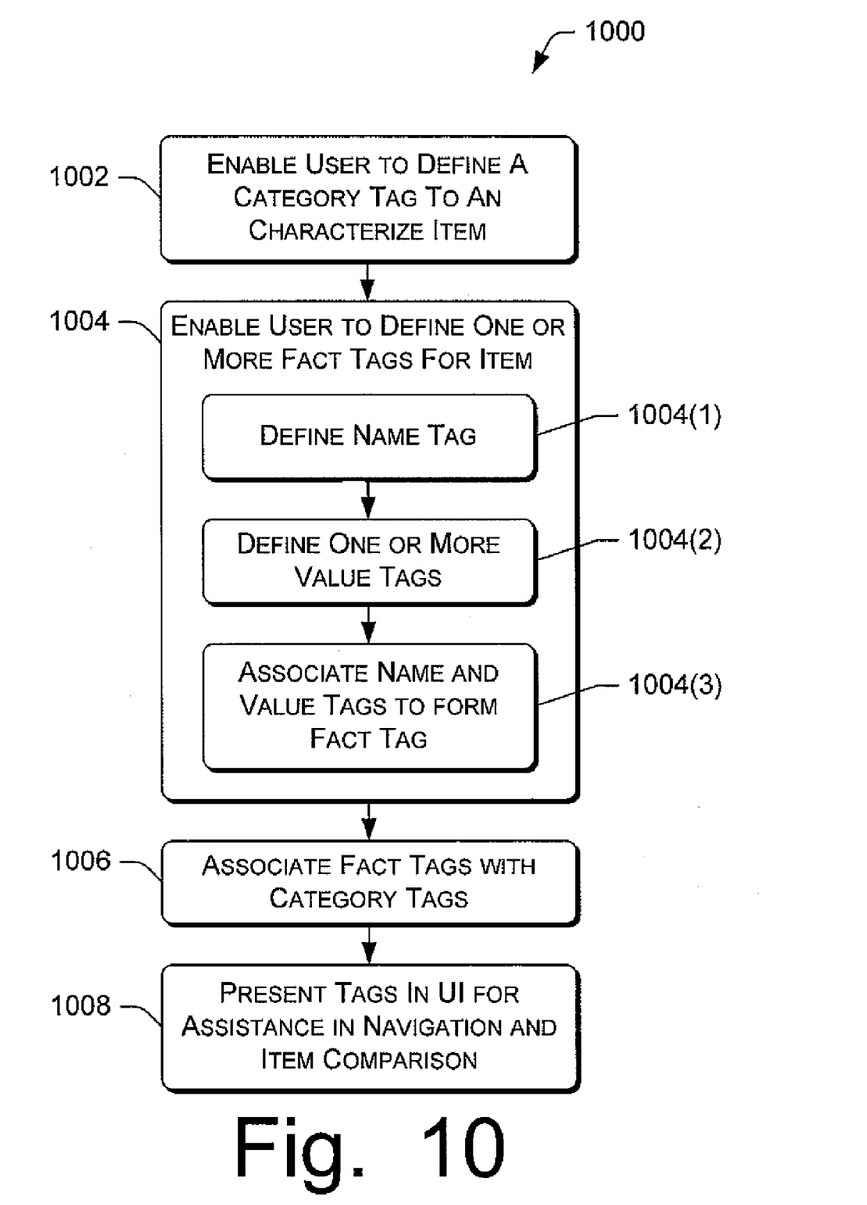
FIG. 10 is a flow diagram of a process for tagging content.
Figure 11:
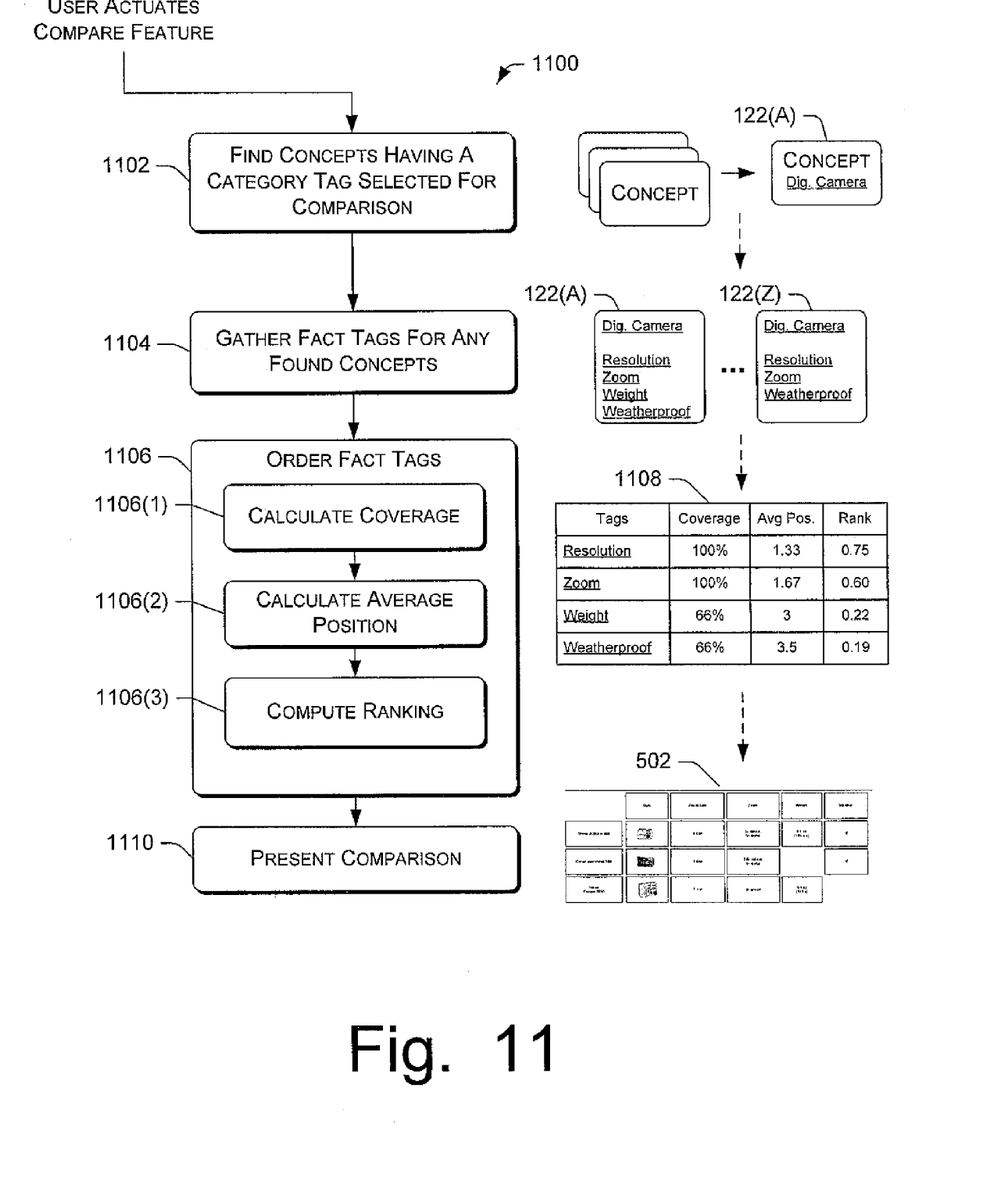
FIG. 11 is a flow diagram of a process for comparing items through use of the tags.

FIGS. 10 and 11 illustrate example processes for tagging digital content and facilitating comparison of items using the tags. Each process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the processes are described with reference to the architecture 100 of FIG. 1, and the item encyclopedia 120 of FIGS. 1 and 9. In particular, many acts described below may be implemented and performed by the item encyclopedia 120 illustrated in FIGS. 1 and 9, and particularly subcomponents of the item encyclopedia 120 shown in FIG. 9.

FIG. 10 shows a process 1000 for tagging items in an electronic catalog. At block 1002, a user is enabled to define a category tag for an associated item. This first kind of tag is used to characterize or categorize the item. It essentially tells what the product is. In the context described above, the user can define tags through interaction with a web page served as part of the item encyclopedia (e.g., the home page 140 in FIG. 3 or the article page 400 in FIG. 4). The tagging is free-form in that the user can assign any descriptor he or she chooses, although it is anticipated that uniformity will grow over time as more users become accustomed to the items and vocabulary used to describe the items. In the context of the example shown in FIG. 4, a user who creates an article on a particular digital camera, such the "Olympus Stylus 800" brand digital camera, may define a category tag "digital camera".

At block 1004, the user is further enabled to define one or more fact tags for the item. This may be done at the time an article in the encyclopedia is first created, or added later by any user. As with category tags described above, the user can define tags through interaction with a web page served as part of the item encyclopedia, and the tagging is free-form. It is further noted that a user may define fact tags independently of category tags, and hence defining a category tag is not a prerequisite to defining fact tags. Moreover, a concept may include fact tags along, without a category tag. However, once both category tags and fact tags are defined for a given item, a relationship is maintained among the tags via the tagging structure 126 of the concept 122.

Defining a fact tag may be viewed as a series of sub-operations 1004(1)-1004(3). As explained above, the fact tags are composed of collections of two or more tags, including one name tag and one or more value tags. Accordingly, at 1004(1), the user defines a name tag that identifies an attribute of the item being characterized by the category tag. In the digital camera example, the user might define a name tag for "weight" or "zoom", as these represent attributes that might be of interest to users who are shopping for a digital camera.

At 1004(2), the user defines one or more corresponding value tags that provide one or more values for the attribute identified by the name tag. For a "weight" name tag representing a physical weight attribute of the camera, the value tag might be the actual weight in ounces or grams, such as "6.4 oz (181.5 g)". For a "zoom" name tag representing the zoom attribute of the camera, multiple value tags might be defined to express the different zoom components. For instance, a first value tag of "3× optical" might be defined to indicate that the zoom attribute achieves a three fold zoom action through optical lens manipulation and a second value tag of "5× digital" might be defined to indicate that the zoom attribute achieves an additional five fold zoom action through manipulation of the digital image after capture.

At 1004(3), the name and value tags are associated with one another to form a fact tag. In our example the "weight" name tag is associated with the corresponding value tag "6.4 oz (181.5 g)" and the "zoom" name tag is associated with the corresponding value tags "3× optical" and "5× digital". The association is accomplished, for example, by the item encyclopedia 120 correlating the name tag with its one or more corresponding value tags in the tagging data structure 126 in the concept object 122.

At block 1006, the fact tags are associated with the category tag. Once again, this association is accomplished via the tagging data structure 126 in the concept object 122. The association of the name and value tags (block 1004(3)), which form the fact tags, and the association of the fact tags and category tags (block 1006) creates a non-flat dimensional tagging structure that affords enhanced navigation, search, and item comparison.

At block 1008, the category and fact tags are presented to a user to assist in navigation through the item encyclopedia, as well as comparison of items. As shown in the example of FIG. 4, the category tags are placed in a category screen section 410 and the fact tags are displayed in a fact screen section 412. The tags are presented as active links (i.e., via underlining or coloration) which can be selected by the user. Users can select any of the category or fact tags to navigate to other pages. Further, the user can compare items based on a selected category or fact tag.

FIG. 11 shows a process 1100 for facilitating comparison of items via the tags. As noted in the diagram, the process 1100 is initiated when a user actuates a compare feature for a particular tag to be compared. In the described implementation, the comparison is being conducted based on a category tag. Such a comparison might be initiated, for example, in response to user selection of the "compare" control 422 next to the category tag "digital camera" to compare various digital cameras. It is noted, however, that the compare control may be located in other regions of the screen and further, that other UI mechanisms may be employed to initiate a comparison.

For purposes of explanation, the process 1100 is described as being implemented by the comparator engine 128 shown in FIGS. 1 and 9. Also, an example is shown along side the various operations to help illustrate some of the computations made by the comparator engine 128.

At block 1102, in response to the user seeking to compare items with the same category tag, the concepts having the category tag which has been selected for comparison are found. With reference to the FIG. 9 implementation, the concept finder 930 searches the concept store 124 for concepts having the selected category tag. Supposing the category is "digital camera", the concept finder 930 locates the concepts 122 with a category tag of "digital camera" in the tagging data structure 126.

At block 1104, fact tags from the identified concepts are then gathered. These fact tags are extracted from the tagging data structure 126 of each concept having the selected category tag. A concept 122(A) for the "Olympus Stylus 800" brand digital camera might, for example, include fact tags for pixel count, weight, zoom features, weatherproof, and so on, as presented in the fact section 412 of the article page 400 in FIG. 4. Concepts for other cameras may have different collections of fact tags, where some of the fact tags are common to multiple concepts and some are not. In FIG. 11, another concept 122(Z) may include fact tags for pixel count, zoom features, and weatherproof, but not for weight.

At block 1106, the fact tags may be optionally ordered according to some predefined criteria. As an example implementation, the ranking engine 932 ranks the fact tags based on how many concepts contain the fact tags (known as "coverage"), and how prominent the fact tags are for a given item based on the their order assigned initially by the author or community (known as "position"). For purposes of illustration, suppose that the concept finder 930 locates three concepts with the category tag "digital camera", and that these concepts have the fact tags shown in Table 1:

TABLE 1

| Concept 1: Olympus | Concept 2: Canon | Concept 3: Nikon |
|---|---|---|
| Category Tag:<br>  Digital Camera<br>Fact Tags:<br>  Resolution<br>  Zoom<br>  Weight<br>  Weatherproof | Category Tag:<br>  Digital Camera<br>Fact Tags:<br>  Zoom<br>  Resolution<br>  Weatherproof | Category Tag:<br>  Digital Camera<br>Fact Tags:<br>  Resolution<br>  Zoom<br>  Weight |

Notice that the fact tags with name tags of "resolution" and "zoom" belong to all three concepts. This indicates that more people felt these facts were important when evaluating the item. The fact tags with name tags of "weight" and "weatherproof" are common to only two of the three concepts. Thus, generally, the ranking engine 932 will give higher priority to the fact tags pertaining to pixel count and zoom capabilities because they are common to more concepts than the fact tags about weight and weatherproofing.

Ordering the fact tags may be viewed as a series of sub-operations 1106(1)-1106(3). At 1106(1), coverage of the fact tags is calculated. As one possible technique, the ranking engine 932 computes the percentage of concepts that contain each of the fact tags, as follows:

Coverage=Number of Concepts with Fact Tag/Total Number of Concepts

So, for each of the fact tags with name tags of "resolution" and "zoom", the coverage is 100% because all three concepts contain these tags. In contrast, the coverage for each of the fact tags with name tags of "weight" and "weatherproof" is 66% because only two of three concepts contain these tags.

At 1106(2), the average position of each fact tag is calculated. One technique to compute average position is to sum the position numbers of the fact tag within each concept, and then divide that sum by the total number of concepts that contain the fact tag, as follows:

Avg Position=Sum of Fact Tag Positions within Concepts/Total Number of Concepts with Fact Tag From table 1 above, the fact tag for "resolution" is listed first in two concepts and second in the third concept. Thus, the average position for this fact tag is 4/3 or 1.33 (i.e., (1+1+2)/3). For the fact tag for "zoom", the average position is 5/3 or 1.67 (i.e., (1+2+2)/3). Similarly, the average positions for the fact tags of "weight" and "weatherproof" are 6/2 or 3 (i.e., (3+3)/2) and 7/2 or 3.5 (i.e., (3+4)/2), respectively.

At 1106(3), a ranking of the fact tags is computed. One approach is to multiple the coverage by the inverse of the position, or:

Rank=Coverage×(1/Avg Position)=Coverage/Avg Position

Table 2 shows the ranks for the four example fact tags.

TABLE 2

| Fact Tags: | Coverage × (1/Avg Position) | Rank |
|---|---|---|
| Resolution | 100% × 3/4 | 0.75 |
| Zoom | 100% × 3/5 | 0.60 |
| Weight | 66% × 1/3 | 0.22 |
| Weatherproof | 66% × 1/3.5 | 0.19 |

In this example, the ranking engine would rank the fact tags in the following order: resolution, zoom, weight, and weatherproof. Table 1108 in FIG. 11 summarizes the ordering operation 1106.

At block 1110, the comparison results are presented to the user. Generally, the presentation aligns the facts with one another in a graphical layout so that the user can easily compare the attributes of the various items. In one implementation, the presentation layout engine 934 arranges the fact tags into a table format. One example layout is illustrated in the comparison page 500 of FIG. 5, with a miniaturized representation shown in FIG. 11. In this example, the name tags are placed as column headings in the table. The associated value tags are then placed in appropriate table cells vertically beneath the corresponding name tags and horizontally across from the item to which the value tag applies. Notice also that the fact tags may be optionally displayed according to their computed ranking. In FIG. 5, the fact tags are arranged in the comparison table in the order of "resolution", "zoom", "weight", and "weatherproof", thereby lending more prominence to fact tags about resolution as compared to the fact tags about weight and whether the camera is weatherproof.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A system for creating tags for existing items published in an electronic catalog, comprising:
  one or more processors; and
  memory to store computer-executable instructions that, when executed, cause the one or more processors to perform acts comprising:
    creating, in response to a first input, a category tag to define a category related to an existing item published in the electronic catalog, wherein:

the category tag characterizes the existing item and is different than an existing category used within the electronic catalog to which the existing item has been assigned; and the first input is received from an entity other than a content provider that provided details of the existing item published in the electronic catalog;

creating, in response to a second input and subsequent to receipt of the first input, one or more fact tags that are associated with the category tag for the existing item, wherein a fact tag comprises a name portion identifying an attribute of the existing item and one or more corresponding value portions providing one or more values of the attribute identified by the name portion, wherein the name portion is a tag and wherein at least one of the one or more value portions is a tag; and transmitting item information of the existing item to a client device based at least in part on a received selection of the category tag and one of the fact tags associated with the existing item.

2. A system as recited in claim 1, further comprising creating multiple category tags for the existing item, wherein two or more of the category tags are concurrently associated with the existing item.

3. A system as recited in claim 1, further comprising adding at least one of the category tag and the fact tags for the existing item in the electronic catalog based at least in part on an input by another entity that is different than the entity that defined the category tag and an entity that defined the one or more fact tags.

4. A system as recited in claim 1, further comprising generating a comparison of items in the electronic catalog based on at least one of the category tags and at least one of the fact tags.

5. A system as recited in claim 4, further comprising:

for each item in the comparison, presenting a respective value portion of the fact tag aligned under a respective attribute of the fact tag to enable a comparison of the value portions across the items in the comparison; and transmitting results of the comparison to a client device.

6. A system as recited in claim 4, further comprising:

presenting results of the comparison; and ordering placement of the fact tags within the results.

7. A system for comparing items provided in an electronic catalog, comprising:

one or more processors; and memory to store computer-executable instructions that, when executed, cause the one or more processors to perform acts comprising:

creating category tags to characterize items in the electronic catalog;

creating fact tag collections, individual-fact tag collections having a name tag to identify an attribute of the item and one or more corresponding value tags to stipulate one or more values of the attribute identified by the name tag;

associating the fact tags with the category tags; and generating a comparison of the items in the electronic catalog based on at least a first tag selected from the category tags and a second tag selected from the name tags or the value tags.

8. A system as recited in claim 7, wherein more than one category tag is created for at least certain items in the item catalog.

9. A system as recited in claim 7, further comprising enabling an entity that did not create the category tag and the fact tag collections to modify subsequently at least one of the category tag and the fact tag collections for the item in the electronic catalog.

10. A system as recited in claim 7, wherein the associating comprises correlating the fact tags with the category tags via a data structure.

11. A system as recited in claim 7, wherein the generating the comparison comprises comparing items that are similarly characterized in response to selection of a category tag.

12. A system as recited in claim 7, wherein the generating the comparison comprises comparing items that are not similarly characterized in response to selection of a fact tag.

13. A system as recited in claim 7, wherein the generating the comparison based on the first tag selected from the category tag comprises:

identifying the items from the electronic catalog that are characterized by a category tag;

gathering the fact tag collections associated with the category tags used to characterize the items identified from the electronic catalog; and arranging the fact tag collections for presentation.

14. A system as recited in claim 13, wherein the arranging comprises ranking the fact tag collections at least in part according to prominence of the name tags.

15. A system as recited in claim 13, wherein the arranging comprises ranking the fact tag collections at least in part according to how many items are tagged with the name tags.

16. A tagging data structure embodied on computer memory that, when executed by a processor, supports tagging of content after publication of the content, the data structure comprising:

executable instructions that, when executed by the processor, cause the processor to create first tags to define categories of the content; and executable instructions that, when executed by the processor, cause the processor to enable creation of second tags associated with respective ones of the first tags, individual ones of the second tags including name tags to describe attributes of the content defined by the associated first tag and one or more value tags to provide one or more values of the attributes, wherein the first tags and the second tags are created by entities other than content providers that provided the content for publication, the first tags and the second tags to enable free-form text associations with the content after publication of the content and in addition to published text associated with the content.

17. A tagging data structure as recited in claim 16, wherein the content comprises products offered by one or more electronic catalogs.

18. A tagging data structure as recited in claim 16, wherein the first and second tags facilitate comparison of the content.

19. A tagging data structure as recited in claim 16, wherein upon selection of a first tag to initiate comparison of the content categorized with the selected first tag, the second tags associated with the selected first tag are arranged such that value tags are organized relative to corresponding name tags to facilitate comparison of the values of the attributes of the content.

20. A tagging data structure as recited in claim 16, wherein the first and second tags facilitate navigation to information pertaining to the content.

21. A tagging data structure as recited in claim 16, wherein the first and second tags are assigned to the content by a community of multiple entities.

22. An item encyclopedia for providing information on items in one or more electronic catalogs, the item encyclopedia comprising:
one or more processors; and
memory, accessible by the one or more processors, the memory storing a program that, when executed by the one or more processors, implements the following acts:
creating an article describing an item in response to an input from a first entity, the article being published for viewing by other, different entities; and
enabling the other, different entities to assign at least one first tag to define a category for the item and at least one second tag associated with the first tag to define an attribute for the item and a value for that attribute,
wherein the at least one second tag comprises a name portion identifying the attribute of the item and one or more corresponding value portions providing one or more values of the attribute identified by the name portion, wherein the name portion is a tag and wherein at least one of the one or more value portions is a tag.

23. An item encyclopedia as recited in claim 22, the acts further comprising enabling collaborative authoring of the article so that another entities, independent of and subsequent to the creation of the article, is permitted to edit the article describing the item.

24. An item encyclopedia as recited in claim 22, the acts further comprising enabling another entity to assign at least one additional first tag or second tag to be associated with the item concurrently with an initial first tag and an initial second tag.

25. An item encyclopedia as recited in claim 22, further comprising a comparator engine to facilitate comparison of items based on one of the first and second tags.

26. An item encyclopedia as recited in claim 22, further comprising a comparator engine to facilitate comparison of items having a common first tag, wherein the comparator engine aligns the second tags associated with the first tag for ease of comparison in a presentation.

27. One or more non-transitory computer-readable media comprising computer-executable instructions that, when executed on one or more processors, perform acts comprising:

creating category tags from user input from users of an electronic catalog, the category tags created at least in part by user collaboration;
assigning the category tags to characterize items offered in an electronic catalog;
creating fact tags from user input from the users of the electronic catalog that correspond to the category tags; and
assigning fact tags in association with the category tags, wherein a fact tag comprises a name portion identifying an attribute of the item and one or more corresponding value portions providing one or more values of the attribute identified by the name portion, wherein the name portion is a tag and wherein at least one of the one or more value portions is a tag.

28. One or more computer-readable media as recited in claim 27, further comprising computer-executable instructions that, when executed on one or more processors, perform an additional act comprising facilitating user collaboration on articles describing the items.

29. One or more computer-readable media as recited in claim 27, further comprising computer-executable instructions that, when executed on one or more processors, perform an additional act comprising facilitating comparison of items based on at least one of the category tags or at least one of the fact tags.

30. One or more computer-readable media as recited in claim 29, wherein the facilitating comparison comprises presenting results of the comparison in a graphical user interface, wherein the fact tags common to the items are ordered in the results.

31. One or more computer-readable media as recited in claim 29, wherein the order of the fact tags is determined based on a function of (1) how many items being compared are tagged with the fact tags and (2) relative position of the fact tags when used to describe each of the items.

* * * * *